US008608355B2

(12) United States Patent
Bruhnke et al.

(10) Patent No.: US 8,608,355 B2
(45) Date of Patent: Dec. 17, 2013

(54) INTERIOR REAR VIEW MIRROR ASSEMBLY WITH PLASTIC SUBSTRATE AND ILLUMINATION

(75) Inventors: Ulrich Bruhnke, Ehningen (DE); Oliver Eder, Pinache (DE); Kurt Wilfinger, Affalterbach (DE)

(73) Assignee: SMR Patents S.a.r.l., Luxembourg (LU)

( * ) Notice: Subject to any disclaimer, the term of this patent is extended or adjusted under 35 U.S.C. 154(b) by 755 days.

(21) Appl. No.: 12/417,985

(22) Filed: Apr. 3, 2009

(65) Prior Publication Data

US 2009/0251913 A1  Oct. 8, 2009

(30) Foreign Application Priority Data

Apr. 3, 2008 (EP) .................................. 081003353

(51) Int. Cl.
*B60Q 1/26* (2006.01)
*B60R 1/12* (2006.01)

(52) U.S. Cl.
USPC .......................................... 362/494; 362/492

(58) Field of Classification Search
USPC .................................................. 362/492, 494
See application file for complete search history.

(56) References Cited

U.S. PATENT DOCUMENTS

| 4,733,336 | A * | 3/1988 | Skogler et al. ............... 362/142 |
| 5,179,471 | A * | 1/1993 | Caskey et al. ................ 359/603 |
| 5,669,698 | A * | 9/1997 | Veldman et al. ............. 362/494 |
| 5,669,699 | A * | 9/1997 | Pastrick et al. ............... 362/494 |
| 6,331,066 | B1 * | 12/2001 | Desmond et al. ............. 362/494 |
| 7,008,090 | B2 * | 3/2006 | Blank ............................ 362/494 |
| 7,080,913 | B2 * | 7/2006 | Henion et al. ................ 359/864 |
| 7,093,965 | B2 * | 8/2006 | Veldman ....................... 362/494 |
| 7,427,150 | B2 * | 9/2008 | Carter et al. .................. 362/494 |
| 7,488,099 | B2 * | 2/2009 | Fogg et al. .................... 362/464 |
| 7,581,859 | B2 * | 9/2009 | Lynam .......................... 362/494 |
| 2006/0050415 | A1 | 3/2006 | Schmidt |
| 2006/0087858 | A1 * | 4/2006 | Lynam et al. ................. 362/494 |
| 2007/0081350 | A1 | 4/2007 | Huang |
| 2008/0112176 | A1 * | 5/2008 | Liesener ....................... 362/494 |
| 2009/0115631 | A1 * | 5/2009 | Foote et al. ................... 340/901 |

FOREIGN PATENT DOCUMENTS

| DE | 3049169 A1 | 12/1980 |
| EP | 0744321 B2 | 11/2001 |
| FR | 1.525.709 | 5/1968 |

OTHER PUBLICATIONS

European Search Report for application EP 08 10 3352 dated Dec. 2, 2008.

* cited by examiner

*Primary Examiner* — David J Makiya
(74) *Attorney, Agent, or Firm* — Reising Ethington PC

(57) ABSTRACT

The invention is related to a rear view mirror formed by a plastic glass structure and mirror housing. The plastic glass allows smooth edges and a bezel free appearance of the mirror. The plastic glass allows in addition to shine through the mirror body to create different types of illumination in the passenger's cabin.

9 Claims, 5 Drawing Sheets

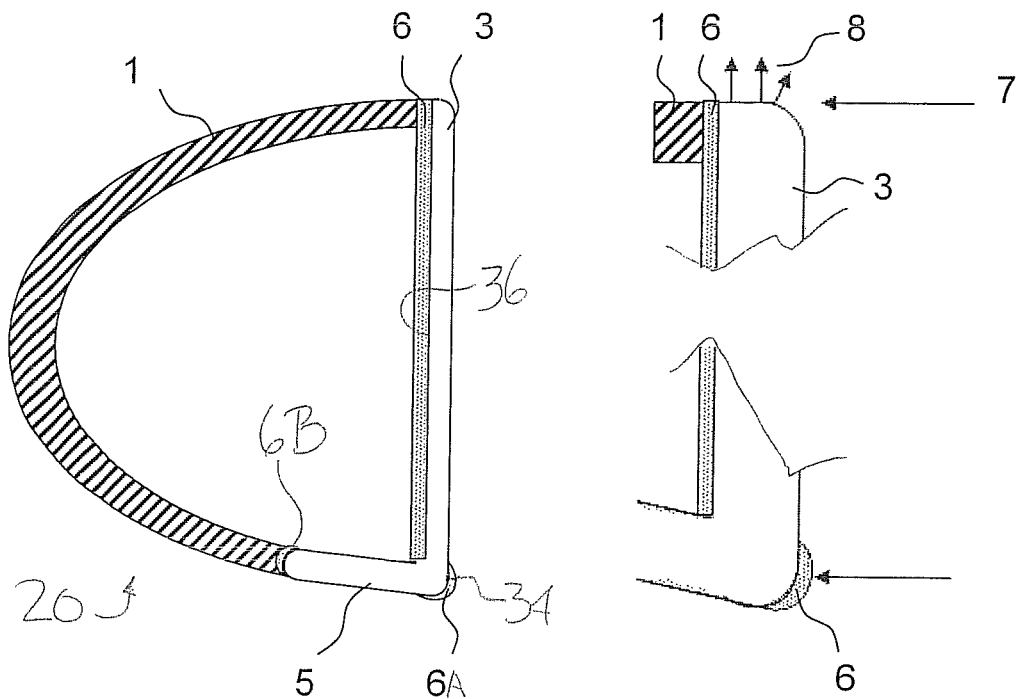
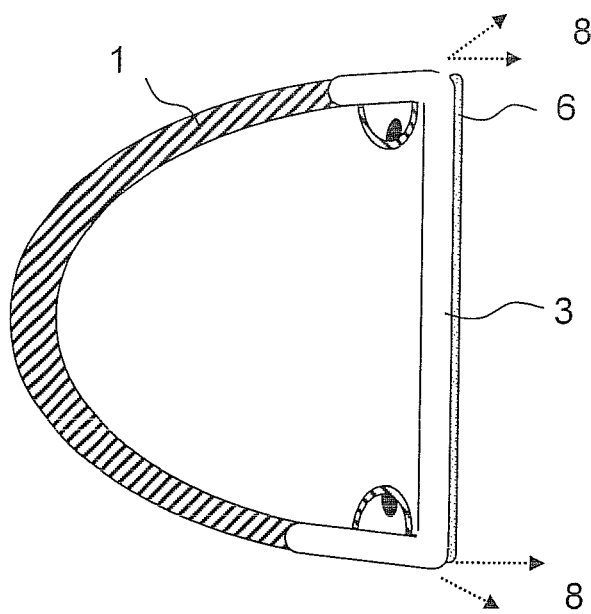
FIG. 3
FIG. 4

INTERIOR REAR VIEW MIRROR ASSEMBLY WITH PLASTIC SUBSTRATE AND ILLUMINATION

The invention is based on a priority patent application EP 08103353.2 which is hereby incorporated by reference.

BACKGROUND OF THE INVENTION

1. Field of the Invention

The invention is related to an interior rear view mirror which is designed in plastic material and has smooth edges. More particularly, the internal rear view mirror has at least in some areas that allow the installation of illumination elements to shine through.

2. Description of the Related Art

Internal rear view mirrors are defined e.g. by the regulations of ECE 324 Regulation 46. For example, an internal rear view mirror has a couple of requirements as the field of vision which must be at least a 20 m wide flat horizontal portion of the road. One of the requirements is related to the passenger security and requests that the edges of the internal rear view mirror must be rounded to a radius not less than 2.5 mm.

As a result of this requirement, the internal rear view mirror known in the art often shows designs with a plastic mirror case defining a front opening. The front opening includes the reflecting glass which is fixed by a retaining bezel inward from the outermost peripheral edge of the retaining bezel. The retaining bezel is form of plastic material to fulfill a safety requirement and comply with the regulation requirement of having a minimum radius of curvature.

The appearance of the internal rear view mirror with the bezel surrounding the reflecting element is not satisfying some design requests.

It is known from EP 07440321 B1 especially from FIGS. 18-21 to design an internal rear view mirror without a retaining bezel. The reflecting element is snapped in the peripheral side walls of the mirror case which forms lips, rounded in the required radius.

This proposed solution includes using a glass mirror to be pressed between the molded side wall lips. The known solution includes a means to illuminate the interior of a vehicle, read lamps and ambient light. The internal rear view mirror is prepared to receive a light module device and the lenses so that light shines through the mirror housing.

It is also know in the art by DE 3049169 to form a plastic substrate for an internal rear view mirror. The plastic substrate is snapped into place and is tightly connected to the mirror housing. The plastic substrate is coated with a reflecting layer on the inner surface of the mirror.

A disadvantage is the connection with the tongue and groove joint that needs a precisely molding to connect the mirror housing part with the mirror without a visible slit.

SUMMARY OF THE INVENTION

The inventive internal rear view mirror consists of mirror housing and a one piece front plastic substrate that has at least one side piece. The fully transparent plastic substrate is molded in one piece and coated with a reflective layer at least partly.

The internal rear view mirror according the invention allows a very simple mirror design including only two main parts: the mirror housing and the front plastic substrate without additional parts, such as lenses or bezels. The transparent plastic substrate is combining the function of the mirror glass, the function of the lenses built in the mirror housing in prior art and the mirror housing with its required smoothed bezel edges.

With the internal rear view mirror according the invention a lightweight mirror is created. The high flexibility of molded plastic substrate allows for many different bezel free designs of the internal rear view mirror. The small weight of the interior mirror allows to ease the mirror base structure or to support further functionalities as GPS receiver, wireless connections, etc without dramatically increase of weight.

BRIEF DESCRIPTION OF THE DRAWINGS

Advantages of the invention will be readily appreciated as the same becomes better understood by reference to the following detailed description when considered in connection with the accompanying drawings, wherein:

FIG. 2a shows a cross section of the internal rear view mirror;

FIG. 2b is an enlarged, partially cutaway, cross-sectional side view of FIG. 2a;

FIG. 3a shows a first embodiment of the invention;

FIG. 3b is an enlarged, partially cutaway, cross-sectional side view of FIG. 3a;

FIG. 4 shows a second embodiment of the invention;

DETAILED DESCRIPTION OF EMBODIMENTS

Figure 1:
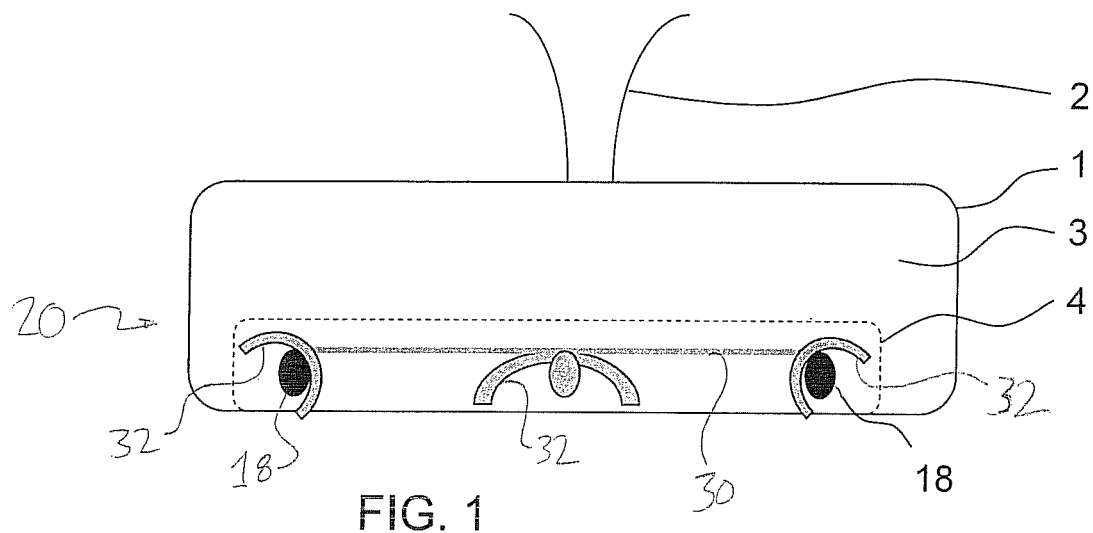
FIG. 1 shows a plane view of a internal rear view mirror.

FIG. 1 shows schematically an internal rear view mirror assembly, generally indicated at 20, from the front side. A mirror housing 1 is attached to a mirror base 2 which is connected to vehicle's roof or wind screen. The mirror housing 1 has an opening 22 to the interior of the vehicle in which a plastic substrate 3 is inserted.

A light module 4 is installed behind the plastic substrate 3 in a cavity 24 of the mirror housing 1. The light module 4 is installed either at a backside 26 or a base side 28 of the mirror housing 1. The light module 4 is known in prior art and comprises a printed circuit board 30 with bulbs 18 and/or LEDs and reflectors 32. In a preferred embodiment only LEDs 18 are installed that works through the lifetime of the rear view mirror assembly 20 and need not be replaced.

Figure 2:
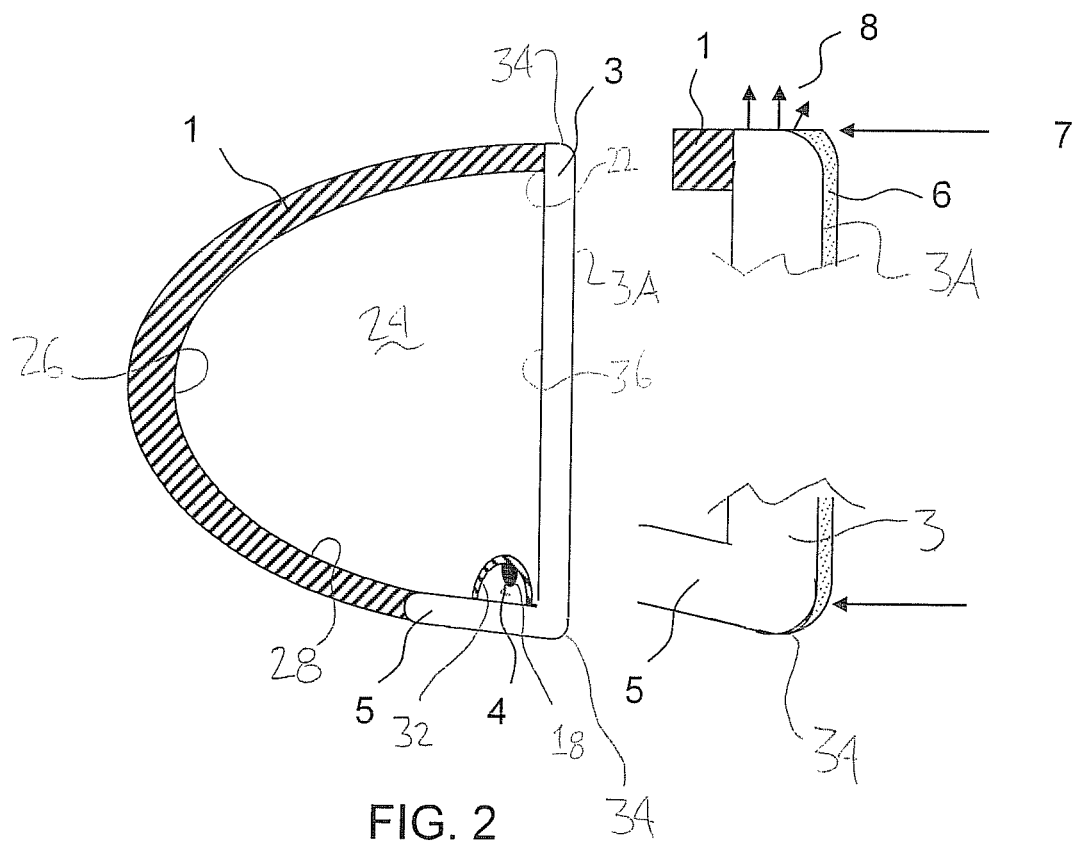

FIGS. 2a and 2b are cross-sectional views of the interior mirror of FIG. 1, with FIG. 2b being partially cut away. The mirror housing 1 and the plastic substrate 3 form a closed cavity 24 in which the electrical and or the electronically elements and circuits are placed. As an example, a part of a light module 4 is shown in the cavity 24. The plastic substrate 3 includes a front plate 3A covering the opening 22 of the mirror housing 1 and has a side piece 5 forming together with the front plate 3A an L-form. More specifically, the side piece 5 extends out from the front plate 3A at an angle with respect to the front plate 3A. The edges 34 of the front plate 3A are smoothed to follow the regulations and design rules. It is possible to have thick front plate 3A with a radius which is much more than is required by the regulations. The plastic substrate 3 is a unitary structure closing the opening 22 of the internal rear view mirror assembly 20. The front plate 3A is coated with a reflective layer 6, normally a metal layer. The L-formed plastic substrate 3 has two functions: to be the mirror (front plate 3A) for the internal rear view mirror assembly 20; and to be the lens (side piece 5) for the interior illumination 18. To achieve this functions, the plastic substrate 3 is formed as a one-piece plastic substrate that is highly transparent and stable. In a further step, the front plate 3A of the plastic substrate 3 is coated with metal layer 6 covering the visible part for passengers looking at the front plate 3A in direction of arrow 7. This means that the internal rear view mirror assembly 20 appears to be without a bezel and fully reflecting. But this means also that the side piece 5 between the non transparent mirror housing 1 and the front plate 3A remains transparent and emits light if the light module 4 in the mirror housing is activated. It is also possible to incorporate edge illumination as sketched with arrows 8.

The two main parts of the interior rear view mirror assembly 20, the housing 1 and the plastic substrate 3, are connect together in a way a person skilled in the art would choose. For example, it is possible to connect the two pieces 1, 3 using a welding or gluing procedure.

FIG. 3 is a second embodiment of the internal rear view mirror assembly 20. In this example, the reference characters describe the same mirror design as in FIGS. 2a and 2b. The difference is the surface on which the reflective metal layer 6 is coated. In this embodiment, the metal layer 6 is on an inner surface 36 of the plastic substrate 3.

As a result of coating, the inner surface 36 with the metal layer 6, the mirror housing 1 would be visible at the lower horizontal part of the mirror housing 1 from the passengers. In this embodiment, this problem is solved with a small area of additional reflective coating 6A along the edge 34.

In this embodiment, the connection between plastic substrate 3 and mirror housing 1 on the top must achieved in a way not to destroy the metal layer of the reflective coating 6. Alternatively, an additional reflective coating area 6B on the outer surface of the front plastic substrate is possible covering the edges 34 of the plastic substrate 3. This solution eases the connection between front plastic substrate 3 and mirror housing 1.

The thickness of the reflective coatings depends on the material and the color that is desired. In FIG. 3, edge illumination 8 appears by guiding the light in the plastic substrate 3.

FIG. 4 is another embodiment of the invention, wherein the plastic substrate 3 includes two side pieces 5 covering the bottom and the top of the mirror housing 1. The front plate 3A of the plastic substrate 3 remains flats. This embodiment is improving the indirect illumination of the internal rear view mirror assembly 20, which is seen in FIG. 6 with dotted lines.

Figure 5:
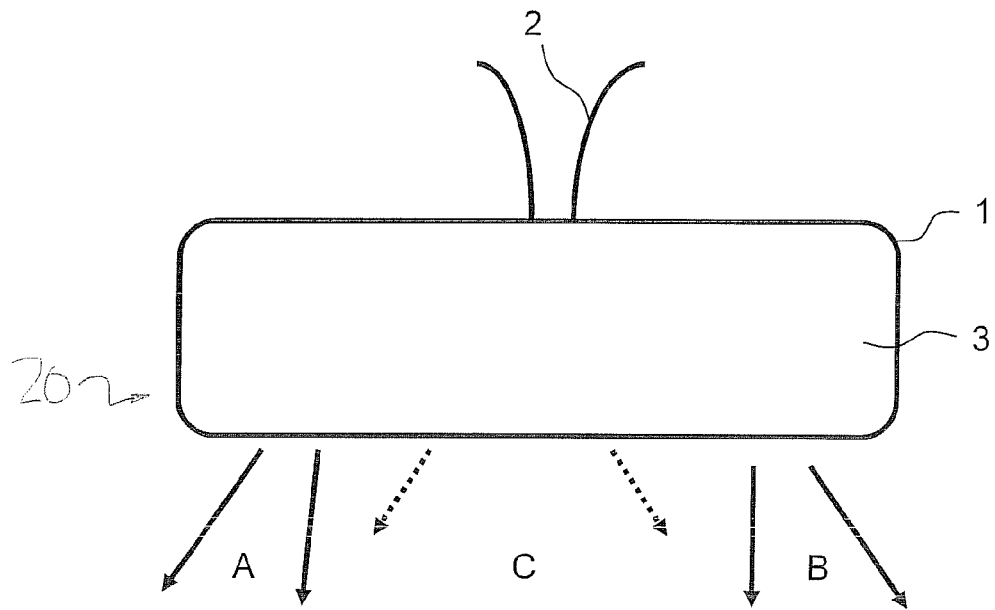
FIG. 5 shows a schematic illumination.
Figure 6:
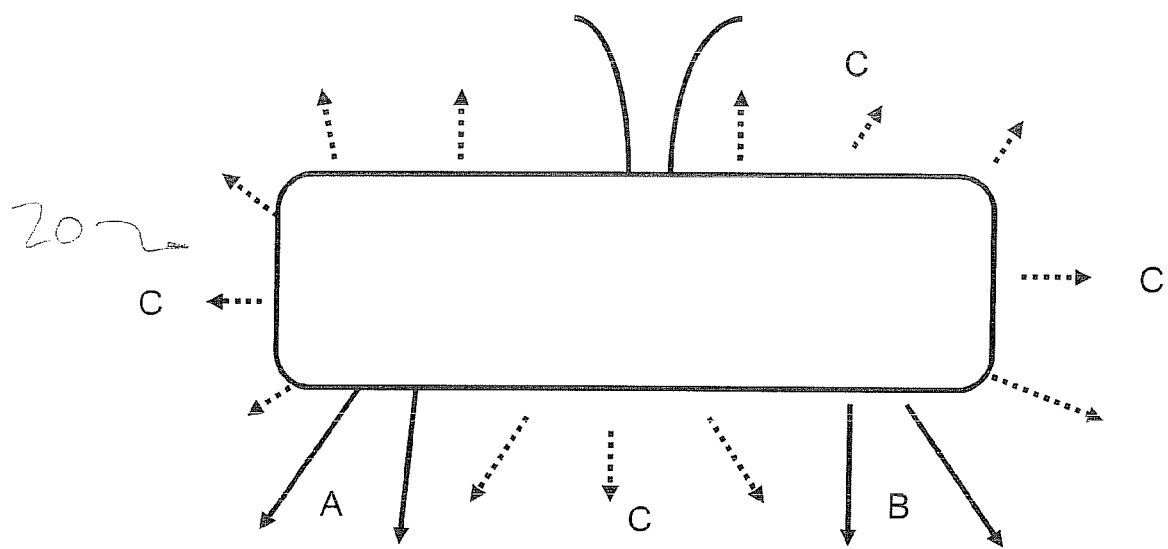
FIG. 6 shows a second schematic illumination.

FIGS. 5 and 6 show the appearance of the lighted internal rear view mirror assembly 20 with different areas of illumination. Areas A and B mark the read lamp function and C is an ambient light following different designs.

The plastic substrate 3 is fabricated from a material that is transparent for visible wavelengths and able to guide visible light to a certain extend. Light is coupled in and coupled out by special surface structures, such as ribs and edges. The surface structures are positioned beside the optical plan surface of the front plastic substrate which is used as a mirror.

The process to mold the plastic substrate is published in the EP 1412158.

The process includes the steps of first providing an injection mold machine. The injection molding machine includes a cavity therein, for forming a transparent plastic article simulating the transparency of glass. The mold includes a pressure sensing and regulating apparatus. The mold is thereafter closed and a clear plastic material is injected into the mold through a port. A portion of the mold is used to pressurize the mold material back into the injection port. After the material is partially injected back into the injection port, the mold is held at a predetermined pressure for optimizing optical properties of the plastic material, to provide a clear transparent plastic material which has optical properties similar to glass.

In the device, there is provided a first mold platen and a second mold platen. The first mold platen includes the cavity for production of the final finished part. A second movable piston portion is provided, which includes a cavity and is adjustable by movement of the piston. The pressure in cavity is adjusted by way of the hydraulic smaller control piston, which is set forth for use in a control system, which hydraulically can compress or adjust the hold position of the movable portion. A proportional valve may be utilized in the control system for controlling the adjustment of the pressure in the mold cavity. A pressure sensor is utilized to determine the pressure in the cavity, for purposes of the hold pressure in the subject process. After this, the proper pressure is determined and the mold cavity is held at this pressure by way of the control system linked to the proportional valve.

Figure 7A:
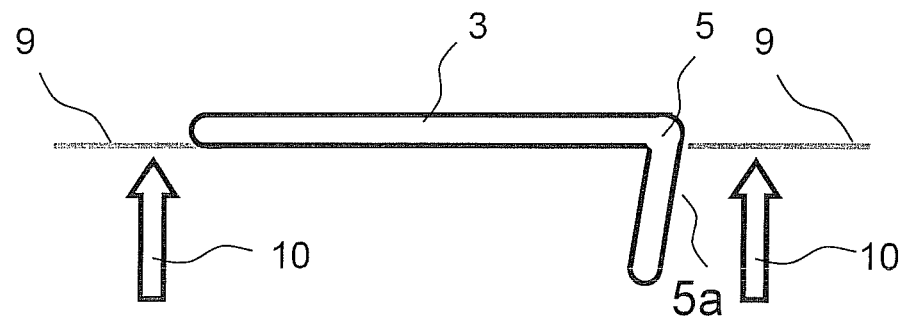
FIG. 7a to b show deforming production process.
Figure 7B:
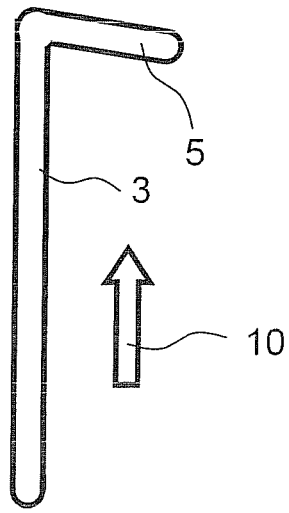
Figure 8:
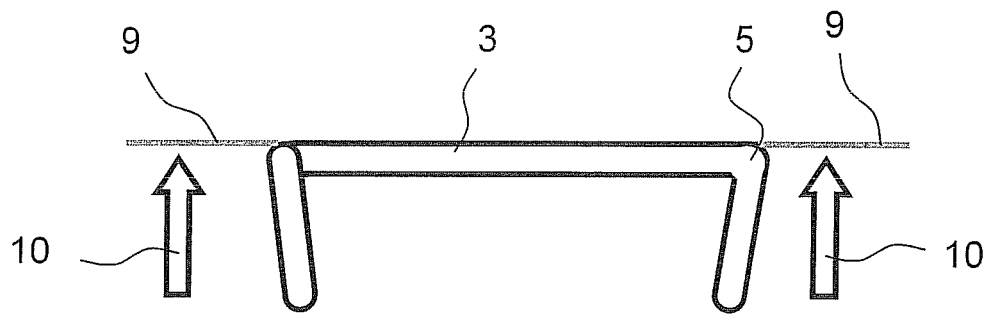
FIG. 8 shows deforming of a second embodiment.

Referring to the examples of FIGS. 7a and b and FIG. 8, there is shown a sample mirror in which various contours of the mirror can be presented as may be desired. This gives options which were hard to create using glass type mirrors or the like. The examples as shown in FIG. 7b with one side piece 5 can be molded in one process and ejected with a piston contacting the side piece of the plastic substrate. The design as shown in FIG. 7a has an adjacent rim which is molded together with the plastic substrate element. The rim is used as a "loosed" part. During the deform process ejectors eject the article via these rims. Afterward the rims are cut off. With a solution like this, the appearance of piston stamps on the transparent plastic substrate is avoided.

A design as shown in FIG. 8 shows a drip mold which means that the molding form must include pistons and pins to remove the article from the cavity.

Preferably, the mold is then held at a pressure of generally from about 900 bar to about 1800 bar preferably from about 1000 to about 1800 bar and preferably from about 1000 to about 1200 bar.

It has been found that by using these steps, a glass-like transparency can be obtained. Utilizing these steps helps relieve internal tension in the material therefore removing barriers to optical clarity which otherwise might arise.

Mold temperatures vary depending on the material used. Typically, suitable temperatures are from about 80 to 120° C. A most preferred temperature of about 80° C. is utilized in the process.

Typical plastics used in the present invention include optical grade injection moldable material, optical grade polycarbonates, methacrylates or methacrylate modified polycarbonates. Suitable materials are obtainable from General Electric, for instance, plastics sold under the trade designations MAKROLON 2207 and LEXAN LSI are particularly suitable in processes of the present invention. Also, it is necessary to provide optical quality polished mold surfaces to maintain the optical properties of the finished part. The optical surface can be restricted to the plane part of the reflective element. The side piece 5 of the front plastic substrate 3 can be designed to appear like frosted glass.

The surface 5a as shown in FIG. 7a is the surface through which illuminating light is emitted. The frosted glass effect achieved by a different structured surface in the molding tool emits a smooth light.

Figure 9:
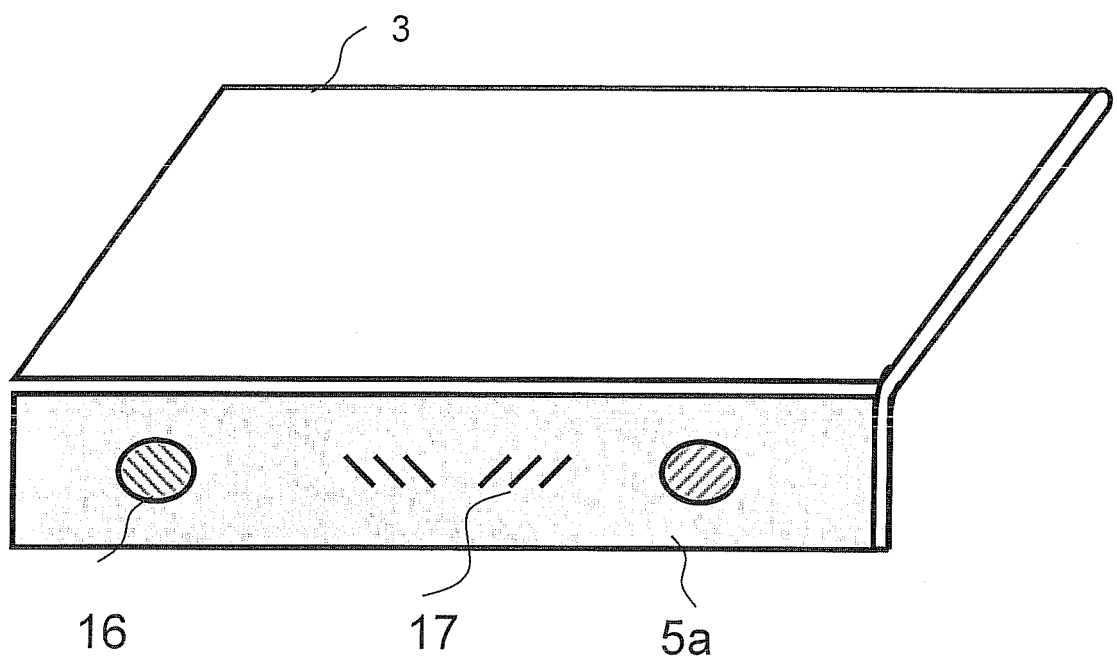
FIG. 9 shows the side piece structure to form a lens.

To provide read lamps the lenses of this read lamps A and B are also molded directly by structuring the tool. Therefore a Fresnel lens can be produced in the same molding step. FIG. 9 shows an embodiment of the front plastic substrate seen from the bottom side of the mirror. The surface 5a of the front plastic substrate 3 includes lenses 16 and a structure 17 out-coupling of light. The surface 5a is in this embodiment not fully transparent.

Subsequent heat treatments of the part which may occur due to protective or reflective coatings which may be applied do not detrimentally affect or degrade the mirrors of the present invention. This is due to the step of maintaining the part under the pressures specified at molding temperature. Generally, dwell times at temperature are from about 0.1 to 60 seconds. Typical dwell times at temperature are from about 10 to 50 seconds, with preferred dwell times being from about 18 to 25 seconds.

Because the plastic is allowed to harden at an elevated temperature and pressure, subsequent treatments requiring heat, such as adding reflective coatings, do not adversely affect the optical properties of the plastic.

LEGEND

1 Mirror Housing
2 Mirror Base
3 Reflective Element
4 Light Module
5 Side Piece of Reflective Element
6 Reflective Coating
6A Reflective Coating on edge
6B Reflective Coating on opening
7 Pane View
8 Edge Illumination
A, B Read Light
C Ambient Light
10 Piston
5a Lens
Surface Structure
18 LED
20 Rear view mirror assembly
22 Opening
24 Cavity
26 Back side of mirror housing
28 Bottom side of mirror housing
30 Printed circuit board
32 Reflectors
34 Edges
36 Inner surface of plastic substrate The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

The invention claimed is:

1. A rear view mirror assembly comprising:
a mirror housing including a cavity and a peripheral curved edge defining a rearwardly facing opening;
a light module fixedly secured within said mirror housing, said light module emitting light out therefrom away from said mirror housing;
a one piece plastic part extending over said rearwardly facing opening;
said one piece plastic part including a coated plastic substrate for reflecting rearward light impinging thereon, said coated plastic substrate forming a mirror;
said one piece plastic part further including a side piece extending out from said coated plastic substrate at an angle thereto;
said side piece connected with said peripheral curved edge, wherein said side piece transmits the light being emitted by said light module when said light module is turned on.

2. A rear view mirror assembly according to claim 1 wherein said mirror includes a reflective coating on a rearward facing surface of said plastic substrate glass.

3. A rear view mirror assembly according to claim 1 wherein said mirror includes a reflective coating on a forward facing surface of said plastic substrate.

4. A rear view mirror assembly according to claim 1 wherein said side piece of said plastic substrate includes a lens structure molded therein.

5. A rear view mirror assembly according to claim 1 wherein said side piece is translucent.

6. A rear view mirror assembly according to claim 1 wherein said lighting module includes an LED oriented to shine through at least one area of said plastic substrate.

7. A rear view mirror assembly according to claim 1 wherein said light module includes at least two LEDs for left and right reading lamps.

8. A rear view mirror assembly according to claim 7 wherein said mirror includes a plurality of side pieces, each of said plurality of side pieces associated with and disposed adjacent each of said LEDs of said light module.

9. A rear view mirror assembly comprising:
a mirror housing defining an opening;
a light module being adapted for emitting light, said light module being fixedly secured within said mirror housing; and
a one piece plastic part being adapted for closing said opening of said mirror housing,
wherein said one piece plastic part includes a first portion forming a front piece and a second portion forming a side piece,
wherein said front piece includes a coating for reflecting light impinging on said front piece from outside said mirror housing,
wherein said side piece transmits light being emitted by said light module towards an area outside of said mirror housing, and
wherein said front piece and said side piece are arranged to define an L-shaped cross section of said one piece plastic part.

* * * * *